United States Patent [19]

Awata et al.

[11] Patent Number: 4,619,796

[45] Date of Patent: Oct. 28, 1986

[54] PROCESS FOR PREPARATION OF POROUS CARBON PLATES

[75] Inventors: Yasuhira Awata, Tokyo; Osamu Iwaki, Ichikawa, both of Japan

[73] Assignee: Oji Paper Company, Ltd., Tokyo, Japan

[21] Appl. No.: 623,260

[22] Filed: Jun. 21, 1984

[51] Int. Cl.$^4$ .............................................. D01F 9/14
[52] U.S. Cl. ................................. 264/29.4; 162/145; 264/29.6; 264/29.7; 423/447.6; 423/447.7; 423/447.9
[58] Field of Search ................... 264/29.4, 29.2, 29.6, 264/29.7; 423/447.6, 447.9, 447.7; 162/145

[56] References Cited

U.S. PATENT DOCUMENTS

| | | | |
|---|---|---|---|
| 3,174,895 | 3/1965 | Gibson et al. | 264/29.7 |
| 3,539,296 | 11/1970 | Selke | 423/447.9 |
| 3,682,595 | 8/1972 | Okuda et al. | 264/29.2 |
| 3,998,689 | 12/1976 | Kitago et al. | 162/145 |
| 4,041,116 | 8/1977 | Baud et al. | 264/29.5 |
| 4,064,207 | 12/1977 | DeCrescente et al. | 264/29.6 |
| 4,080,413 | 3/1978 | Layden et al. | 264/29.2 |
| 4,115,528 | 9/1978 | Christner et al. | 264/29.5 |
| 4,226,816 | 10/1980 | Yamamoto et al. | 264/29.4 |
| 4,234,650 | 11/1980 | Schieber | 264/29.7 |
| 4,434,206 | 2/1984 | Fukuda et al. | 264/29.2 |

FOREIGN PATENT DOCUMENTS

| | | | |
|---|---|---|---|
| 1947363 | 3/1971 | Fed. Rep. of Germany | 264/29.4 |
| 58-120818 | 7/1983 | Japan | 264/29.2 |
| 1197906 | 7/1970 | United Kingdom | 264/29.2 |

*Primary Examiner*—Jeffery Thurlow
*Attorney, Agent, or Firm*—Armstrong, Nikaido, Marmelstein & Kubovcik

[57] ABSTRACT

Porous carbon plates are made by forming a sheet from a mixture comprising 65–90 weight parts of a carbon fiber-forming organic fiber and 10–35 weight parts of a pulp according to a paper-making method; impregnating the sheet with a solution of an organic polymeric substance to prepare an impregnated sheet; subjecting the impregnated sheet to an oxidizing treatment; and then carbonizing the infusibilized sheet at a temperature of at least 800° C. in an inert gas atmosphere.

12 Claims, No Drawings

PROCESS FOR PREPARATION OF POROUS CARBON PLATES

BACKGROUND OF THE INVENTION

1. Field of the invention

This invention relates to a novel process for the preparation of porous carbon plates. More specifically, it relates to a process for preparing a thick porous carbon plate excellent in chemical resistance, electric conductivity and strength by forming a sheet according to a paper-making method, impregnating the sheet with a polymeric material and carbonizing the impregnated sheet.

2. Description of the Prior Art

As the conventional process for preparing a carbon fiber sheet, there is known a process in which a carbon fiber-incorporated paper sheet is formed from a pulp, a binder and a carbon fiber according to a paper-making process. However, this carbon fiber-incorporated paper sheet has a relatively high electric resistance and is poor in the chemical resistance. Therefore, this paper sheet is not suitably used for an electrode of a fuel cell or the like. There also is known a process in which the above-mentioned carbon fiber-incorporated paper sheet is impregnated with a solution of a thermosetting resin and is heated to be thereby carbonized in an inert atmosphere again (see U.S. Pat. No. 3,998,689). Since an organic substance such as a pulp is carbonized by the heat treatment, according to this process, there can be obtained a fiber paper having a lower electric resistance and a better chemical resistance than that of the above-mentioned carbon fiber-incorporated paper sheet. However, since the carbon fiber per se has a high modulus of elasticity, the fiber contact portion is not sufficiently bonded. Accordingly, it is difficult to prepare a carbon fiber paper sheet having a sufficiently low electric resistance. Moreover, since the carbon fiber has a high specific gravity and a hot water-soluble binder is used, it is difficult to prepare a bulky porous plate and also to control the bulk density and pore size to levels suitable for various uses. Moreover, since the baking step must be conducted two times, the product is expensive, and reduction of the manufacturing cost is desired. Still further, according to the above-mentioned process, it is difficult to obtain a thick sheet having a uniform thickness, and since the carbon fiber has no hydrophilic property and a high modulus of elasticity, the adhesion to the pulp is poor and the sheet strength is low. Therefore, it is necessary to incorporate a binder fiber together with the pulp.

As means for increasing the strength of a carbon plate, there is ordinarily adopted a method in which a starting sheet is reinforced by an impregnation treatment with a solution of a phenolic resin or the like. However, in case of a thick sheet, the impregnation often becomes uneven and because of limitations of the impregnation and drying capacities, the productivity cannot be increased.

SUMMARY OF THE INVENTION

It is a primary object of the present invention to provide a process in which the above-mentioned defects are overcome and by which a porous carbon plate having a high quality can be prepared at a moderate cost.

In accordance with the present invention, there is provided a process for the preparation of porous carbon plates, which comprises impregnating a sheet formed from a mixture comprising 65 to 90 parts by weight of a carbon fiber-forming organic fiber and 10 to 35 parts by weight of a pulp according to a paper-making method with a solution of an organic polymeric substance to prepare an impregnated sheet; subjecting the impregnated sheet to an oxidizing treatment; and then carbonizing the infusibilized sheet at a temperature of at least 800° C. in an inert gas atmosphere.

In the process of the present invention, the impregnated sheet may be heat-pressed to effect molding and curing. A laminate of thin impregnated sheets may be heat-pressed.

DESCRIPTION OF THE PREFERRED EMBODIMENTS

Any of the organic fibers ordinarily used for the production of carbon fibers, such as rayon fiber, a pitch fiber, a lignin fiber, a phenolic resin fiber and a polyacrylonitrile fiber may be used as the organic fiber in the present invention. The organic fiber used in the present invention has a fineness of 0.5 to 15 denier and a length of 1 to 15 mm. From the viewpoint of the adaptability to the paper-making operation, it is preferred that the fineness be 0.5 to 8 denier and the length be 1.5 to 10 mm. The above-mentioned organic fibers may be used alone or in combination. Furthermore, a carbon fiber may be incorporated in an amount of up to 10% by weight, so far as attainment of the object of the present invention is not hindered.

Since the above-mentioned organic fiber is poor in the hydrophilic property, a sheet cannot be prepared according to a paper-making method if the organic fiber is used alone. Therefore, a pulp is incorporated as an additive for improving the adaptability to the sheet-formation.

Not only a cellulose pulp but also synthetic pulps formed of synthetic resins can be used in the present invention. These pulps act as additives for enhancing the adaptability of the organic fiber to the sheet-formation at the paper-making step. In the present invention, since a sheet is formed from the organic fiber and pulp, a bulky sheet can be obtained.

Various polymeric compounds and additives may be incorporated into a base sheet composed mainly of an organic fiber, which is advantageously used in carrying out the present invention. For example, there may be incorporated strengthening agents such as cationized starch, cationized polyacrylamide, anionized polyacrylamide, carboxyl-modified polyvinyl alcohol, gelatin, a melamine resin, a urea resin and an epoxidized polyamide resin.

The organic fiber and pulp are mixed in amounts of 65 to 90 parts by weight and 10 to 35 parts by weight (as solids), respectively, and the mixture is formed into a sheet according to a conventional paper-making method. If the amount of the organic fiber is smaller than 65 parts by weight and the amount of pulp is larger than 35 parts by weight, a desirable bulky sheet cannot be formed and it becomes difficult to control of the pore size and porosity and thus to obtain a porous sheet having a high porosity. If the amount of the organic fiber is larger than 90 parts by weight and the amount of pulp is smaller than 10 parts by weight, it is difficult to attain a good sheet-formation according to a paper-making method. It is preferred that the organic fiber be used in an amount of 75 to 90 parts by weight and the pulp be used in an amount of 10 to 25 parts by weight.

As the organic polymeric substance used for impregnation of the paper sheet, there can be mentioned, for example, thermosetting resins such as a phenolic resin, an epoxy resin, an unsaturated polyester resin and a polydivinylbenzene resin, a thermoplastic resins such as a vinyl chloride resin, a vinylidene chloride resin, vinyl fluoride resin, a vinylidene fluoride resin and an acrylonitrile resin, and lignin, pitch and tar.

It is preferable to use an organic polymeric substance having such properties that it is soluble in certain solvent or is fused at a high temperature by the heat treatment, and the carbon content is at least 30% by weight and it acts as a carbonaceous binder for internal bonding in the resultant carbon fiber. In view of such properties, a thermosetting resin is preferably used.

The organic fiber-pulp mixed paper sheet is impregnated with a solution or dispersion of the organic polymeric substance. If the amount of the organic polymeric substance adhering to the paper sheet by impregnation is too small, the binder effect is low and the carbonization degree is low at the carbonizing step. In contrast, if the amount of the adhering organic polymeric substance is too large, clogging is caused and adjustment of the porosity becomes difficult, and the sheet becomes brittle. Accordingly, it is preferred that the amount of the impregnated organic polymeric substance be 20 to 200% by weight, especially 30 to 120% by weight, based on the paper sheet.

In the case where regenerated cellulose, for example, rayon is used as the organic fiber, if an impregnation treatment with a heat resistance improver is carried out separately from the above-mentioned impregnation treatment with the organic polymeric substance, there can be attained effects of improving the carbonization degree and strength. Any of heat resistance improvers customarily used for the production of carbon fibers may be used. For example, there are preferaby used metal phosphates such as magnesium primary phosphate, calcium primary phosphate, sodium primary phosphate and potassium primary phosphate, and ammonium salts of various acids such as ammonium chloride, ammonium sulfate, ammonium hydrogensulfate, ammonium phosphate, ammonium hydrogenphosphate, ammonium dihydrogenphosphate, ammonium polyphosphate and ammonium borate.

The impregnated sheet is then subjected to the pressing treatment, if desired. The press molding is carried out for imparting necessary thickness, shape, porosity and pore size to the final carbon plate. If the heat treatment is conducted simultaneously with the pressing treatment, the resin in the impregnated sheet is cured. By this heat treatment, the thickness of the sheet can be kept constant and a flat sheet can be obtained. Furthermore, the porosity and pore size can optionally be adjusted by adjusting the pressing pressure.

At the press treatment, there may be adopted a method in which a plurality of, preferably at least three, thin impregnated sheets are superposed upon another and similarly pressed. If this method is adopted, a thick carbon plate can easily be obtained. Lamination of porous sheets, which is difficult according to the conventional process because the sheets are readily separated off, is made possible if the press-laminating and curing method is adopted. When impregnated sheets are superposed upon another, if the sheets are placed alternately in the longitudinal direction and in the transverse direction, the resultant laminate is isotropic, and thus, a strain is hardly produced at the heating and carbonizing step and a carbon plate having a uniform thickness, which is free of curls or cracks, can be obtained. It is preferred that the pressing treatment be carried out at 150° to 220° C. for 1 to 60 minutes.

The impregnated sheet or the impregnated and pressed sheet is then subjected to the oxidizing treatment and is then carbonized to obtain a porous carbon plate. The oxidizing treatment conditions are not particularly critical but are appropriately decided according to the kind of the organic fiber used. Ordinarily, the oxidizing treatment is carried out at 150° to 350° C. for scores of minutes to ten-odd hours in air.

After the oxidizing treatment, the sheet is carbonized at a temperature higher than 800° C. in an inert gas atmosphere, whereby a porous carbon sheet is obtained.

According to the process of the present invention, a sheet obtained from a fiber customarily used for the production of a carbon fiber, such as a regenerated cellulose fiber, a pitch fiber or a polyacrylonitrile fiber, according to a paper-making method is impregnated, preferably superposed upon another and pressed, and heated and carbonized to obtain a thick porous carbon plate.

The first characteristic feature of the present invention is that since the starting sheet is prepared from the organic fiber and pulp according to a paper-making method, a sheet having a low density is obtained, and since no carbon fiber is used, about ½ of the starting sheet is gasified and lost at the carbonizing treatment conducted at a temperature higher than 800° C., a porous carbon plate having a very high porosity can easily be obtained. For example, a carbon plate prepared from a sheet of a carbon fiber formed according to a paper-making method has a porosity of 70% at highest, but according to the process of the present invention, a carbon plate having a porosity of 80 to 85% can easily be obtained.

The second characteristic feature of the present invention is that since the starting sheet is prepared according to a conventional paper-making method, the productivity is improved and the sheet can be obtained at a reduced cost. Furthermore, the starting material used in the present invention has a better adaptability to the paper-making operation than a carbon fiber, and therefore, a uniform flat sheet can easily be obtained. Moreover, the basis weight of the sheet can optionally be adjusted. Still further, if thin sheets are laminated and the laminate is pressed according to the present invention, a porous carbon plate having an optional thickness can easily be prepared. Still in addition, if the size of the starting fiber is appropriately selected or the composition or pressing treatment is appropriately adjusted, the pore size and porosity, which are important factors when the carbon sheet is used as an electrode material of a fuel cell, can optionally and easily be controlled.

For better illustration of the present invention, examples will now be described. It should be noted that these examples by no means limit the scope of the invention. In the examples, all of "parts" and "%" are by weight.

EXAMPLES 1 THROUGH 3

A mixture comprising two types of rayon staple fibers having finenesses of 8 denier and 1.5 denier, respectively, a pulp (LUKP) having a Canadian freeness of 500 ml and a polyvinyl alcohol fiber (VPB 105-2×3 supplied by Kuraray) at a ratio shown in Table 1 was incorporated with water. A sheet having a basis weight of 200 g/m² was prepared from the thus-obtained slurry by a cylinder paper machine. The sheet was impregnated with an aqueous 30% sodium dihydrogenphosphate solution (the amount of the sodium dihydrogenphosphate adhered was 40% by weight based on the sheet) and was then impregnated with an aqueous 20% solution of a phenolic resin ("PR-51404" supplied by Sumitomo-Durez) (the amount of the phenolic resin adhered was 40% by weight based on the sheet as solids). The impregnated sheet was dried at 100° C. and subjected to an oxidizing treatment at 180° C. for 30 minutes.

Then, the sheet was carbonized for 1 hour in a nitrogen gas atmosphere maintained at 900° C. under a pressing pressure of 7 g/cm² to obtain a carbon fiber sheet. The physical properties of the sheet are shown in Table 1.

TABLE 1

|  | Example 1 | Example 2 | Example 3 |
|---|---|---|---|
| Composition (% by weight) of Fibers |  |  |  |
| Rayon (8 de - 8 mm) | 40 | 60 | 80 |
| Rayon (1.5 de - 5 mm) | 40 | 20 | 0 |
| Pulp | 15 | 15 | 15 |
| Polyvinyl alcohol fiber | 5 | 5 | 5 |
| Carbonization Degree (%) | 36 | 38 | 38 |
| Bulk Density (g/cm²) | 0.27 | 0.27 | 0.29 |
| Pore size (μm) | 36 | 58 | 62 |
| Porosity (%) | 69 | 59 | 59 |
| Volume Resistivity (Ω-cm) | 0.14 | 0.16 | 0.17 |

Note

The pore size and porosity were determined by using a mercury porosimeter.

From the results shown in Table 1, it is seen that according to the process of the present invention in which a sheet prepared according to a paper-making method is directly carbonized, a carbon sheet having an excellent low electric resistance can be obtained and by changing the mixing ratio of the starting fibers, the pore size and porosity can freely be controlled.

EXAMPLES 4 THROUGH 8

A carbon fiber sheet was prepared from a comprising 80 parts of a rayon fiber having a fineness of 8 denier and a length of 8 mm, 15 parts of NBKP and 5 parts of the same polyvinyl alcohol fiber as used in Example 1 in the same manner as described in Example 1. The carbonization was carried out at 1,000° C. In some runs, the impregnation treatment with sodium dihydrogen-phosphate was not carried out. The obtained results are shown in Table 2.

TABLE 2

|  | Example No. | | | | |
|---|---|---|---|---|---|
|  | 4 | 5 | 6 | 7 | 8 |
| Amount (%) of Adhering Sodium Dihydrogenphosphate | 42 | 26 | 0 | 0 | 0 |
| Amount (%) of Adhering Phenolic Resin | 32 | 32 | 40 | 70 | 120 |
| Carbonization Degree (%) | 45 | 42 | 30 | 35 | 42 |
| Bulk Density (g/cm³) | 0.36 | 0.31 | 0.26 | 0.30 | 0.38 |
| Volume Resistivity (Ω-cm) | 0.047 | 0.052 | 0.062 | 0.060 | 0.057 |
| Bending Strength (kg/cm²) | 139 | 127 | 110 | 135 | 107 |

Note

The bending strength was determined according to method T-469 of TAPPI.

EXAMPLES 9 THROUGH 12

A mixture comprising a polyacrylonitrile fiber having a fineness of 3 denier and a length of 5 mm, a pitch fiber and a pulp (NUKP) having a Canadian freeness of 400 ml at a ratio shown in Table 3 was incorporated with water to obtain a slurry. A sheet having a basis weight of 600 g/m² was prepared from the thus-obtained slurry according to a customary paper-making method using a cylinder paper machine. The sheet was impregnated with an aqueous 40% solution of a phenolic resin (PR-51404 supplied by Sumitomo Durez) (the amount of the adhering phenolic resin was 80% based on the sheet) and was then dried at 105° C.

Then, the impregnated sheet was heat-treated at 180° C. for 15 minutes and was subjected to an oxidizing treatment at 220° C. for 4 hours in air. Then, the sheet was sandwiched between graphite plates and carbonized for 1 hour in a nitrogen gas atmosphere oven maintained at 1,000° C. A porous carbon plate having a good evenness and a high porosity was obtained.

The obtained results are shown in Table 3.

TABLE 3

|  | Example 9 | Example 10 | Example 11 | Example 12 |
|---|---|---|---|---|
| Composition (% by weight) of Fibers |  |  |  |  |
| Polyacrylonitrile fiber | 70 | 80 | 90 | — |
| Pitch fiber | — | — | — | 80 |
| Pulp | 30 | 20 | 10 | 20 |
| Thickness (mm) of Carbon Plate | 2.0 | 2.3 | 2.6 | 2.1 |
| Carbonization Degree (%) | 48.4 | 50.0 | 52.4 | 60.5 |
| Bulk Density (g/cm³) | 0.39 | 0.34 | 0.31 | 0.35 |
| Pore Size (μm) | 43 | 48 | 48 | 48 |
| Porosity (%) | 78 | 81 | 82 | 81 |
| Volume Resistivity (Ω-cm) | 0.05 | 0.05 | 0.05 | 0.04 |

Note

The pore size and porosity were determined by a mercury porosimeter.

EXAMPLES 13 AND 14

A mixture comprising 85% of a polyacrylonitrile fiber having a fineness of 5 denier and a length of 3 mm and 15% of a pulp (NUKP) having a Canadian freeness of 500 ml was incorporated with water to obtain a slurry. A sheet having a basis weight of 200 g/m² was prepared from the thus-obtained slurry according to a customary paper-making method using a cylinder paper machine. This sheet was impregnated with an aqueous 40% solution of a phenolic resin (PR-51404 supplied by Sumitomo-Durez) (the amount of the adhering phenolic resin was 100% based on the sheet) and was dried at 105° C.

A number, shown in Table 4, of thus-prepared impregnated sheets were superposed alternately in the longitudinal direction and in the lateral direction, and the laminate was compressed by a press so that the thickness was 2.5 mm. The pressed laminate was heat-treated at 180° C. for 15 minutes and was subjected to an oxidizing treatment in air at 220° C. for 4 hours. Then, the laminate was sandwiched between graphite plates and carbonized in a nitrogen gas atmosphere oven maintained at 1,000° C. A porous carbon plate being free of interlaminar separation and having a good evenness was obtained.

The obtained results are shown in Table 4.

TABLE 4

|  | Eample 13 | Example 14 |
|---|---|---|
| Composition (% by weight) of Fibers | | |
| Polyacrylonitrile fiber | 85 | 85 |
| Pulp | 15 | 15 |
| Number of Laminated Sheets | 3 | 5 |
| Thickness (mm) of Carbon Plate | 2.0 | 2.0 |
| Carbonization Degree (%) | 54 | 54 |
| Bulk Density (g/cm$^3$) | 0.46 | 0.77 |
| Pore Size (μm) | 45 | 36 |
| Porosity (%) | 75 | 58 |
| Volume Resistivity (Ω-cm) | 0.04 | 0.04 |

Note

The pore size and porosity were determined by a mercury porosimeter.

We claim:

1. A process for the preparation of porous carbon plates, which comprises impregnating a sheet formed from a mixture consisting essentially of 65to 90% by weight of a carbon fiber-forming unoxidized organic fiber and 10 to 35% by weight of a pulp according to a paper-making method with a solution of an organic polymeric substance to prepare an impregnated sheet, subjecting the impregnated sheet to an oxidizing treatment, and carbonizing the resulting infusibilized sheet at a temperature of at least 800° C. in an inert gas atmosphere.

2. A process according to claim 1, wherein the carbon fiber-forming unoxidized organic fiber has a fineness of 0.5 to 15 denier and a length of 1 to 15 mm.

3. A process according to claim 1, wherein the carbon fiber-forming unoxidized organic fiber is selected from the group consisting of a polyacrylonitrile fiber, a rayon fiber, a pitch fiber, a lignin fiber and a phenolic resin fiber.

4. A process according to claim 1, wherein the sheet is formed from a mixture consisting essentially of 75 to 90% by weight of the carbon fiber-forming unoxidized organic fiber and 10 to 25% by weight of the pulp.

5. A process according to claim 1, wherein the organic polymeric substance is soluble in a solvent or fusible when heated, and contains at least 30% by weight of carbon.

6. A process according to claim 5, wherein the organic polymeric substance is selected from the group consisting of a phenolic resin, an epoxy resin, an unsaturated polyester resin, polydivinylbenzene, polyvinyl chloride, polyvinylidene chloride, polyvinyl fluoride, polyvinylidene fluoride, polyacrylonitrile, lignin, pitch and tar.

7. A process according to claim 1, wherein the amount of the impregnated organic polymeric substance is in the range of 20 to 200% by weight based on the weight of the sheet.

8. A process according to claim 1, wherein the sheet has a strengthening agent incorporated therein.

9. A process according to claim 1, wherein the impregnated sheet is heat-pressed to effect molding and curing and is then subjected to the oxidizing treatment.

10. A process according to claim 9, wherein a plurality of the impregnated sheets are laminated together and the resulting laminate is heat-pressed.

11. A process according to claim 9, wherein the heat-pressing is carried out at a temperature of 150° to 220° C. for 1 to 60 minutes.

12. A process according to claim 1, wherein the oxidizing treatment is carried out at a temperature of 150° to 350° C. in air.

* * * * *